(12) United States Patent
Ramachandran et al.

(10) Patent No.: US 8,776,901 B2
(45) Date of Patent: Jul. 15, 2014

(54) PREVENTION OR MITIGATION OF STEEL CORROSION CAUSED BY COMBUSTION GAS

(75) Inventors: Sunder Ramachandran, Sugar Land, TX (US); Vladimir Jovancicevic, Richmond, TX (US); Ksenija Babic-Samardzija, Katy, TX (US); Ha M. Nguyen, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 353 days.

(21) Appl. No.: 13/107,074

(22) Filed: May 13, 2011

(65) Prior Publication Data

US 2011/0278024 A1 Nov. 17, 2011

Related U.S. Application Data

(60) Provisional application No. 61/334,418, filed on May 13, 2010.

(51) Int. Cl.
*E21B 43/16* (2006.01)

(52) U.S. Cl.
USPC .................... 166/402; 166/307; 166/371

(58) Field of Classification Search
None
See application file for complete search history.

(56) References Cited

U.S. PATENT DOCUMENTS

| | | | |
|---|---|---|---|
| 4,339,349 A | 7/1982 | Martin et al. | |
| 5,020,595 A | 6/1991 | Van Slyke | |
| 5,643,534 A | 7/1997 | Minevski | |
| 6,192,987 B1 | 2/2001 | Funkhouser et al. | |
| 6,443,229 B1 | 9/2002 | Kulka | |
| 2003/0141066 A1 | 7/2003 | Karanikas et al. | |
| 2003/0173082 A1 | 9/2003 | Vinegar et al. | |
| 2003/0183390 A1 | 10/2003 | Veenstra et al. | |
| 2003/0192693 A1 | 10/2003 | Wellington | |
| 2004/0020642 A1 | 2/2004 | Vinegar et al. | |
| 2004/0145969 A1 | 7/2004 | Bai et al. | |
| 2005/0025661 A1 | 2/2005 | Crovetto | |
| 2005/0167103 A1 * | 8/2005 | Horner et al. | 166/268 |
| 2010/0084256 A1 | 4/2010 | Vandor | |
| 2010/0092368 A1 | 4/2010 | Neumann et al. | |
| 2010/0099587 A1 | 4/2010 | Welton et al. | |
| 2010/0303694 A1 * | 12/2010 | Aines | 423/230 |
| 2011/0127036 A1 * | 6/2011 | Tilmont et al. | 166/303 |

OTHER PUBLICATIONS

Austrian Search Report dated Apr. 24, 2013.
Second Austrian Search Report dated Apr. 24, 2013.

* cited by examiner

*Primary Examiner* — Zakiya W Bates
(74) *Attorney, Agent, or Firm* — Mossman, Kumar & Tyler PC

(57) ABSTRACT

Recovering oil and gas from subterranean oil and gas reservoirs using gas injection can serve an additional purpose of capturing and sequestering carbon dioxide. This can be accomplished where the feed gas for the gas injection is, at least in part, carbon dioxide from a carbon dioxide capture and sequestration process. Corrosion of steel in a gas transportation system due to the presence of carbon dioxide and water and oxygen may be prevented or at least mitigated by employing a corrosion inhibitor effective at preventing or mitigating steel corrosion in the presence of oxygen and carbon dioxide. The corrosion inhibitors may incorporate alkyl succinic acids, alkyl succinic anhydrides, and trimer acids.

20 Claims, No Drawings

PREVENTION OR MITIGATION OF STEEL CORROSION CAUSED BY COMBUSTION GAS

CROSS-REFERENCE TO RELATED APPLICATION

This application claims priority from U.S. Provisional Application Ser. No. 61/334,418, filed on May 13, 2010, the disclosure of which is incorporated herein by reference in its entirety.

BACKGROUND

1. Field of the Disclosure

The invention relates to the prevention or mitigation of steel corrosion by combustion gas. The invention particularly relates to such corrosion prevention or mitigation in an application of carbon dioxide capture and sequestration or enhanced oil recovery.

2. Background of the Disclosure

Carbon capture and sequestration (CCS) is the process of diverting carbon dioxide that would otherwise be released into the atmosphere. In some applications, CCS includes utilizing the diverted carbon dioxide in industrial and food production. In other applications, the carbon dioxide may be used to displace methane from coal within underground coal seams. In still other applications, the carbon dioxide may be used to re-energize subterranean oil and gas reservoirs (enhanced oil recovery). In yet other applications, the carbon dioxide may be merely stored underground; for example within saline formations and depleted oil and gas reservoirs.

Vast amounts of such carbon dioxide could be stored using these methods. For example, it is believed that as much as 12,000 billion tons of carbon dioxide could be employed during enhanced oil recovery. Known deep saline reservoirs could hold as much as 10,000 billion tons of carbon dioxide.

SUMMARY

In one aspect, the invention is, in a process for recovering oil and gas from subterranean oil and gas reservoirs using gas injection wherein the carbon dioxide is, at least in part, from a carbon dioxide capture and sequestration process, the improvement comprising employing a corrosion inhibitor effective at preventing or mitigating steel corrosion in the presence of oxygen.

In another aspect, the invention is, in a process for capturing and sequestering carbon dioxide, the improvement comprising employing a corrosion inhibitor effective in preventing or mitigating steel corrosion in the presence of oxygen.

DESCRIPTION

In one embodiment, the invention is an improvement to the enhanced recovery of oil and gas. Enhanced oil recovery (EOR) involves methods of recovering more oil from a reservoir than can be obtained from the naturally occurring drive mechanisms such as solution gas drive (fluid expansion) or water influx. EOR involves the introduction of artificial/supplemental forces or energy into the reservoir for the purpose of aiding the natural drive mechanisms. EOR can occur at any stage in the production life, although it is usually relegated to secondary or tertiary aspects. Some types of EOR include water flooding, gas flooding, steam injection, and carbon dioxide injection.

Planning an EOR project demands meticulous attention to the various factors that influence the selection of an EOR candidate. Although EOR is a powerful technique for recovering more hydrocarbons from a producing reservoir, it is not always a commercially viable option. Traditionally the EOR potential of candidate reservoirs is evaluated using classical reservoir engineering techniques. Engineers quantify EOR potential one field at a time using numerical methods and field specific data. This process can be very time-consuming and often yields inaccurate or incomplete results. For purposes of this application, "gas flooding" refers to gas injected to access oil not accessible to a waterflood.

In some applications of the methods of the disclosure, carbon dioxide flooding is alternated with water flooding. Any method known to those of ordinary skill in the art of doing gas flooding, including alternation with water flooding may be used with the method of the disclosure.

In practicing the method of the disclosure, where that method includes gas flooding, the gas used includes carbon dioxide from a carbon dioxide capture and sequestration process. The entire feed of flood gas may be CCS carbon dioxide or the feed of flood gas may include additional gas streams such as, but not limited to, nitrogen, natural gas, and the like.

The method of the disclosure may also be practiced with carbon dioxide capture and sequestration processes. During a CCS process, flue gas from the combustion of natural gas, coal, diesel, fuel oil, and even bio fuel oils may be captured. This flue gas contains carbon dioxide, and in most cases nitrogen and possibly significant amounts of oxygen. There can also be water. The combination of water, oxygen and carbon dioxide can be very corrosive to steel.

Unfortunately, steel would be the material of choice than any system of transporting the CCS carbon dioxide to locations where it could be utilized; either downhole or in the production of food or industrial materials. Despite the corrosion issue, use of other materials would probably be cost prohibitive. For example, it would be too expensive to the line the transportation system with fiberglass or high alloy steel which could be resistant to corrosion.

For the purposes of this application, the term transportation system means any system for moving CCS carbon dioxide from the point of capture to a location for either storage (sequestration) or end use. One example of such a transportation system may include a pipeline, injection well, and in some embodiments associated oil and gas production equipment. In one embodiment, the corrosion inhibitor is used directly on the tubing of the injection well. In still another embodiment, the corrosion inhibitor is used also on the tubing of the production well. Another embodiment of a method of the disclosure includes using the inhibitor on one or the other, but not both, the injection well tubing and a production well tubing.

In one embodiment of the method of the disclosure, a corrosion inhibitor is introduced into the transportation system for CCS carbon dioxide. The corrosion inhibitor may be prepared from a formulation including a trimer acid. Trimer acids may have the general formula:

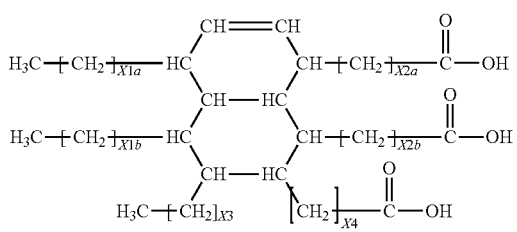

wherein X1a, X1b, X2a, X2b, X3, and X4 are zero or an integer having a value of from 1 to about 10.

The trimer acids may be prepared by combining a polyunsaturated carboxylic acid with a carboxylic acid having a single unsaturation in the presence of a catalyst. For example, in one embodiment, the trimer acid would have a formula:

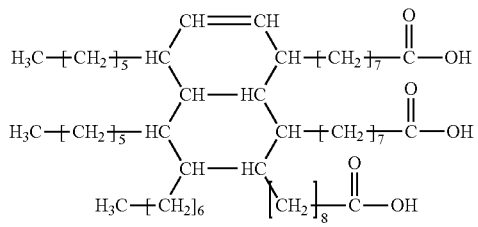

In an alternative embodiment, the trimer acid may be prepared with the formulation including several acids resulting in a structure where X1a, X1b, X2a, X2b, X3, and X4 are all different.

In another embodiment of the method of the disclosure, the corrosion inhibitor may be prepared using alkyl substituted succinic acids and/or alkyl substituted succinic anhydrides. These compounds have the general formulae:

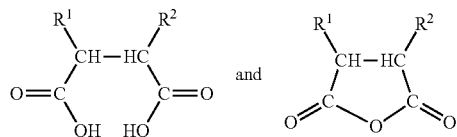

wherein $R^1$ and $R^2$ may be the same or different and is a hydrogen or an alkyl group having from about 6 to about 24 carbons. $R^1$ and $R^2$ may not both be hydrogen and the total carbons in both $R^1$ and $R^2$ may not exceed 24. For example, in one embodiment, the additive includes nonyl succinic anhydride. In a different embodiment, the additive is prepared using dodecyl succinic acid.

Combinations of the trimer acid and alkyl succinic acids and anhydrides may also be used to prepare the corrosion inhibitors of the disclosure. For example, in one embodiment of the method of the disclosure, natural oil is used to prepare the alkyl substituted succinic acid. The resulting corrosion inhibitor has a primary component, but several other oligomers are also present. In still another embodiment, a combination of a trimer acid and dodecyl succinic acid is used. Any combination of these compounds may be used with the method of the disclosure, subject to the caveat that the combination is effective to prevent or mitigate steel corrosion in the presence of carbon dioxide, water, and oxygen.

The corrosion inhibitors useful with the method of the disclosure may also include other compounds. For example, they may include solvents, dispersants, stabilizers, and the like. Any additional compound known to be useful to those of ordinary skill in the art may be used with the corrosion inhibitors useful with the method of the disclosure.

The corrosion inhibitors may also be introduced into a flue gas transportation system using any method known to be useful to those of ordinary skill in the art. In one embodiment of the method of the disclosure, the corrosion inhibitor is introduced as a mist into the flue gas as it enters the transportation system. In another embodiment, the corrosion inhibitor is introduced at intervals of from 100 meters (m) to 1000 m; again as a mist.

In an alternative embodiment, the corrosion inhibitor may be introduced as a liquid slug. For example, a slug of liquid inhibitor may be introduced into a well tubing or a pipeline in a quantity sufficient to coat the tubing or pipeline. Such treatment may be repeated daily, weekly, monthly or even quarterly. In some embodiments the liquid may be introduced continuously.

EXAMPLES

The following examples are provided to illustrate the invention. The examples are not intended to limit the scope of the invention and they should not be so interpreted. Amounts are in weight parts or weight percentages unless otherwise indicated.

Example 1

Corrosion tests were performed at 177° F. in a sparged beaker apparatus at atmospheric pressure with a gas consisting of 8.33 mole % oxygen and 91.67 mole % carbon dioxide (Test Gas #1). The corrosion rate was measured using linear polarization resistance (LPR). Corrosion inhibitor formulation A was tested. Corrosion inhibitor A is an admixture of 15% dodecyl succinic acid and 20% trimer acid dissolved in an aromatic solvent.

Introduction of 1000 ppm corrosion Inhibitor formulation A onto mild steel resulted in an immediate reduction of corrosion from a rate of above 100 mpy to less than 20.

Introduction of 500 ppm corrosion Inhibitor formulation A onto mild steel resulted in an immediate reduction of corrosion from a rate of above 100 mpy to less than 20.

Introduction of 1000 ppm corrosion Inhibitor formulation A onto mild steel resulted in an immediate reduction of corrosion from a rate of above 100 mpy to less than 20 After 20 hours of continuous gas sparge, the corrosion rate was still less than 20 mpy.

Example 2

The trimer acid and dodecyl succinic acid were tested individually using the same testing conditions as disclosed above. Each component was applied at a concentration of 35%. Trimer acid (Corrosion Inhibitor B) by itself produced a short term reduction in corrosion, but was ineffective after about 7 hours. Dodecyl succinic acid (Corrosion Inhibitor C) was more effective than Corrosion Inhibitor B and was still effective at 20 hours. In a test it brought the blank corrosion rate above 100 mpy to below 30 mpy. Neither component was as effective as the Corrosion Inhibitor A from Example 1.

Example 3

Corrosion testing was performed in the sparged beaker test using 1% NaCl at 177° F. with Test Gas #2 which contains 16.67 mole % oxygen and the balance as carbon dioxide.

Corrosion Inhibitors A and C were applied to mild steel at a concentration of 1000 ppm. Both compositions caused an immediate decrease in corrosion from about 200 mpy to about 30 mpy. After about 20 hours, the compositions were still showing a corrosion rate of below 30 mpy.

Discussion Of The Examples

Trimer acid and alkyl succinates and anhydrides mitigate corrosion of steel in the presence of oxygen, water and carbon dioxide. Alkyl succinates and anhydrides appear to be more effective than trimer acids. Alkyl succinates and anhydrides appear to combine synergistically with trimer acids.

The invention claimed is:

1. A process for recovering oil and gas from subterranean oil and gas reservoirs using carbon dioxide gas injection wherein the carbon dioxide is, at least in part, from a carbon dioxide capture and sequestration (CCS) process, comprising: introducing a fluid including a corrosion inhibitor into a wellbore tubular, the corrosion inhibitor preventing or mitigating steel corrosion in the presence of oxygen; allowing the fluid to enter the reservoir; and recovering oil, gas, and/or at least a portion of the fluid from the reservoir.

2. The method of claim 1 additionally comprising water flooding.

3. The method of claim 2 wherein the gas injection and water flooding are alternated during recovering oil and gas from subterranean oil and gas reservoirs.

4. The method of claim 1 wherein all gas injected is carbon dioxide from a CCS process.

5. The method of claim 1 wherein gas injected comprises carbon dioxide from a CCS process and a member selected from the group consisting of nitrogen, natural gas, and combinations thereof.

6. A process for capturing and sequestering carbon dioxide comprising employing a corrosion inhibitor effective in preventing or mitigating corrosion in the presence of oxygen; wherein the corrosion inhibitor is introduced into a member of the group consisting of: a pipeline originating at a carbon dioxide capture facility, a production wellbore tubular, an injection wellbore tubular and combinations thereof; wherein the pipeline originating at a carbon dioxide sequestration facility, production wellbore tubular, and injection wellbore tubular; function to transport or sequester carbon dioxide from the carbon dioxide capture facility within a reservoir.

7. The process of claim 6 wherein material protected by the corrosion inhibitor is steel.

8. The process of claim 7 wherein the steel is within a system used to transport captured carbon dioxide.

9. The process of claim 8 wherein the system used to transport captured carbon dioxide is a flue gas transport system.

10. The process of claim 9 wherein the corrosion inhibitor is introduced as a mist into the flue gas transport system.

11. The process of claim 8 wherein the system used to transport capture carbon dioxide includes a well tubing.

12. The process of claim 11 wherein the inhibitor is introduced into the well tubing as a liquid slug.

13. The process of claim 6 wherein the corrosion inhibitor is prepared using a formulation including a trimer acid.

14. The process of claim 13 wherein the trimer acid has a general formula:

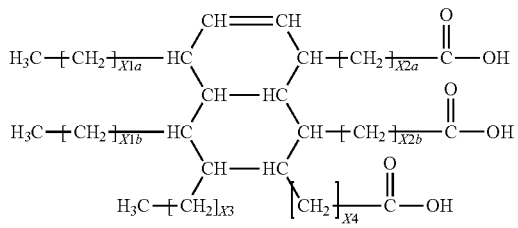

wherein X1a, X1b, X2a, X2b, X3, and X4 are zero or an integer having a value of from 1 to about 10.

15. The process of claim 14 wherein the trimer acid has the general formula:

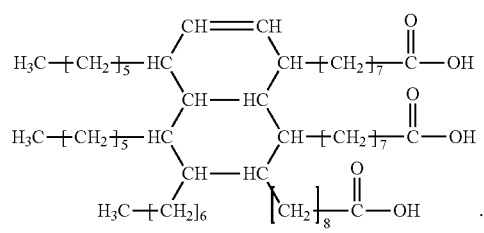

16. The process of claim 6 wherein the corrosion inhibitor is prepared using alkyl substituted succinic acids and/or alkyl substituted succinic anhydrides.

17. The process of claim 16 wherein the alkyl substituted succinic acids and/or alkyl substituted succinic anhydrides have the general formula:

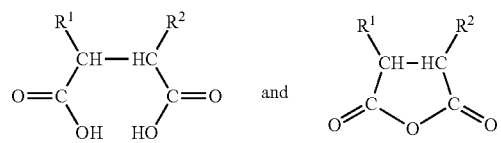

wherein $R^1$ and $R^2$ may be the same or different and is a hydrogen or an alkyl group having from about 6 to about 24 carbons, and $R^1$ and $R^2$ may not both be hydrogen, and the total carbons in both $R^1$ and $R^2$ may not exceed 24.

18. The process of claim 6 wherein the corrosion inhibitor is a combination of a trimer acid and alkyl succinic acids and/or anhydrides.

19. The process of claim 6 wherein the carbon dioxide is a captured from the combustion of at least one member selected from the group consisting of natural gas, coal, diesel, fuel oil, and bio fuel oils.

20. The process of claim 6 wherein the corrosion inhibitor includes at least one member of the group consisting of solvents, dispersants, stabilizers and combination thereof.

* * * * *